(12) United States Patent
An et al.

(10) Patent No.: US 10,924,637 B2
(45) Date of Patent: Feb. 16, 2021

(54) PLAYBACK METHOD, PLAYBACK DEVICE AND COMPUTER-READABLE STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Shan An, Beijing (CN); Yu Chen, Beijing (CN); Shishuang Li, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

(*) Notice: Subject to any disclaimer, the term of this patent is extended or adjusted under 35 U.S.C. 154(b) by 0 days.

(21) Appl. No.: 16/494,577

(22) PCT Filed: Dec. 29, 2017

(86) PCT No.: PCT/CN2017/119668
§ 371 (c)(1),
(2) Date: Sep. 16, 2019

(87) PCT Pub. No.: WO2018/166275
PCT Pub. Date: Sep. 20, 2018

(65) Prior Publication Data
US 2020/0092444 A1  Mar. 19, 2020

(30) Foreign Application Priority Data
Mar. 17, 2017 (CN) .......................... 201710160248.8

(51) Int. Cl.
*H04N 5/14* (2006.01)
*H04N 5/232* (2006.01)

(52) U.S. Cl.
CPC ......... *H04N 5/144* (2013.01); *H04N 5/23216* (2013.01); *H04N 5/23296* (2013.01); *H04N 5/23299* (2018.08)

(58) Field of Classification Search
None
See application file for complete search history.

(56) References Cited

U.S. PATENT DOCUMENTS 9,285,883 B2* 3/2016 Bi .......................... G06F 3/011
10,735,724 B2* 8/2020 Choi .................... H04N 19/167
(Continued)

FOREIGN PATENT DOCUMENTS

CN  101582959 A  11/2009
CN  102044034 A   5/2011
(Continued)

OTHER PUBLICATIONS

Munsell, A., PNG vs. WebP Image Formats (https://www.andrewmunsell.com/blog/png-vs-webp/) (Jun. 4, 2013), accessed Aug. 4, 2020 (Year: 2013).*

(Continued)

*Primary Examiner* — Lindsay J Uhl
(74) *Attorney, Agent, or Firm* — Oblon, McClelland, Maier & Neustadt, L.L.P.

(57) ABSTRACT

A playback method, a playback device and computer-readable storage medium related to the data processing field. The playback method includes acquiring several frames in a video and device movement information of a shooting device when the video is shot; acquiring an initial viewing angle and a current viewing angle of a playback terminal used for playing the several frames; determining a frame
(Continued)

corresponding to the current viewing angle according to the device movement information and a difference between the current viewing angle and the initial viewing angle; and playing the frame corresponding to the current viewing angle.

15 Claims, 5 Drawing Sheets

(56) References Cited

U.S. PATENT DOCUMENTS

| | | | |
|---|---|---|---|
| 2012/0306722 A1 | 12/2012 | Kim et al. | |
| 2013/0148940 A1* | 6/2013 | Schmit | H04N 5/783 386/230 |
| 2015/0244944 A1* | 8/2015 | Tokutake | H04N 5/23293 348/239 |
| 2017/0359549 A1* | 12/2017 | Baran | H04N 5/3532 |

FOREIGN PATENT DOCUMENTS

| | | |
|---|---|---|
| CN | 103377469 A | 10/2013 |
| CN | 105357585 | 2/2016 |
| CN | 105898594 A | 8/2016 |
| CN | 106339980 A | 1/2017 |
| CN | 106341600 A | 1/2017 |
| JP | 2010-256534 A | 11/2010 |

OTHER PUBLICATIONS

International Search Report and Written Opinion dated Mar. 19, 2018 in PCT/CN2017/119668, 10 pages.

Combined Chinese Office Action and Search Report dated Nov. 4, 2019 in corresponding Chinese Patent Application No. 201710160248.8 (with English Translation of Category of Cited Documents), 9 pages.

* cited by examiner

PLAYBACK METHOD, PLAYBACK DEVICE AND COMPUTER-READABLE STORAGE MEDIUM

CROSS-REFERENCE TO RELATED APPLICATIONS

This application is based on the application with a CN application number of 201710160248.8 and the filing date being on Mar. 17, 2017, and claims its priority. The disclosure of this CN application as a whole is incorporated into the present application herein by reference.

TECHNICAL FIELD

The present disclosure relates to the data processing field, and in particular to a playback method, a playback device and a computer-readable storage medium.

BACKGROUND

In the related art, a photograph may be used to record an image of a subject such as a person or a scene. However, the photograph is used to record a still image, and only show a single angle. Therefore, the user cannot understand the details of the photographed object from multiple angles.

For example, when a user browses a shopping website, the user wants to view images of various angles of a product to decide whether to purchase the product. Currently, shopping websites provide users with multiple photographs, such as front view, side view, top view, etc. of an item. However, since the shooting angles of these pictures are limited, when the user views the pictures, the continuity between the pictures at different angles is poor, and the user needs to manually switch different pictures repeatedly to understand the overall view of the object to be shot, which makes the operation of the user cumbersome.

SUMMARY

According to a first aspect of some embodiments of the present disclosure, there is provided a playback method comprising: acquiring several frames in a video and device movement information of a shooting device when the video is shot; acquiring an initial viewing angle and a current viewing angle of a playback terminal used for playing the several frames; determining a frame corresponding to the current viewing angle according to the device movement information and a difference between the current viewing angle and the initial viewing angle; and playing the frame corresponding to the current viewing angle.

In some embodiments, the device movement information comprises a moving direction; the determining the frame corresponding to the current viewing angle according to the device movement information and the difference between the current viewing angle and the initial viewing angle comprises: determining a ratio of the difference between the current viewing angle and the initial viewing angle to a viewing range as an offset; searching a frame corresponding to the offset from the initial viewing frame in a direction in which a frame sequence number decreases, in the case where a moving direction of the playback terminal moving from the initial viewing angle to the current viewing angle is opposite to the moving direction of the shooting device when the video is shot; searching a frame corresponding to the offset from the initial viewing frame in a direction in which the frame sequence number increases, in the case where the moving direction of the playback terminal moving from the initial viewing angle to the current viewing angle is the same as the moving direction of the shooting device when the video is shot; determining the frame corresponding to the offset as the frame corresponding to the current viewing angle.

In some embodiments, the device movement information comprises moving speed information; acquiring several frames in the video comprises: extracting moving speed information from the device movement information; determining a speed level, to which the moving speed information of each unit of time belongs; acquiring one or more frames from frames shot in each unit of time, wherein, a number of the frames is equal to a number corresponding to the speed level.

In some embodiments, the acquiring the initial viewing angle and the current viewing angle of the playback terminal comprises: during a playing process, acquiring angle information of the playback terminal in firstly playing a frame as an initial viewing angle; when a change degree of the angle information of the playback terminal is greater than a preset value, acquiring changed angle information as a current viewing angle.

In some embodiments, the playback method further comprises: inputting two adjacent frames into a deep learning model to obtain image features of the two adjacent frames respectively; removing one of the two adjacent frames when a distance between the image features of the two adjacent frames is less than a preset value.

In some embodiments, the playback method further comprises: compressing several frames by adopting a Web picture compression algorithm based on predictive coding, wherein a compression quality is between 40 and 80.

According to a second aspect of some embodiments of the present disclosure, there is provided a playback device, comprising: a processor; and a memory coupled to the processor, storing program instructions which, when executed by the processor, cause the processor to: acquire several frames in a video and device movement information of a shooting device when the video is shot; acquire an initial viewing angle and a current viewing angle of a playback terminal used for playing the several frames; determine a frame corresponding to the current viewing angle according to the device movement information and a difference between the current viewing angle and the initial viewing angle; and play the frame corresponding to the current viewing angle.

In some embodiments, the device movement information comprises a moving direction; the determining the frame corresponding to the current viewing angle according to the device movement information and the difference between the current viewing angle and the initial viewing angle comprises: determining a ratio of the difference between the current viewing angle and the initial viewing angle to a viewing range as an offset; searching a frame corresponding to the offset from the initial viewing frame in a direction in which a frame sequence number decreases, in the case where a moving direction of the playback terminal moving from the initial viewing angle to the current viewing angle is opposite to the moving direction of the shooting device when the video is shot; searching a frame corresponding to the offset from the initial viewing frame in a direction in which the frame sequence number increases, in the case where the moving direction of the playback terminal moving from the initial viewing angle to the current viewing angle is the same as the moving direction of the shooting device when the video is shot; determining the frame corresponding to the offset as the frame corresponding to the current viewing angle.

In some embodiments, the device movement information comprises moving speed information; acquiring several frames in the video comprises: extracting moving speed information from the device movement information; determining a speed level, to which the moving speed information of each unit of time belongs; acquiring one or more frames from frames shot in each unit of time, wherein, a number of the frames is equal to a number corresponding to the speed level.

In some embodiments, the acquiring the initial viewing angle and the current viewing angle of the playback terminal comprises: during a playing process, acquiring angle information of the playback terminal in firstly playing a frame as an initial viewing angle; when a change degree of the angle information of the playback terminal is greater than a preset value, acquiring changed angle information as a current viewing angle.

In some embodiments, the memory further stores program instructions which, when executed by the processor, cause the processor to: input two adjacent frames into a deep learning model to obtain image features of the two adjacent frames respectively; remove one of the two adjacent frames when a distance between the image features of the two adjacent frames is less than a preset value.

In some embodiments, the memory further stores program instructions which, when executed by the processor, cause the processor to: compress several frames by adopting a Web picture compression algorithm based on predictive coding, wherein a compression quality is between 40 and 80.

According to a third aspect of some embodiments of the present disclosure, there is provided a non-transitory computer-readable storage medium having stored thereon a computer instructions which, when executed by a processor, cause the processor to: acquire several frames in a video and device movement information of a shooting device when the video is shot; acquire an initial viewing angle and a current viewing angle of a playback terminal used for playing the several frames; determine a frame corresponding to the current viewing angle according to the device movement information and a difference between the current viewing angle and the initial viewing angle; and play the frame corresponding to the current viewing angle.

In some embodiments, the device movement information comprises a moving direction; the determining the frame corresponding to the current viewing angle according to the device movement information and the difference between the current viewing angle and the initial viewing angle comprises: determining a ratio of the difference between the current viewing angle and the initial viewing angle to a viewing range as an offset; searching a frame corresponding to the offset from the initial viewing frame in a direction in which a frame sequence number decreases, in the case where a moving direction of the playback terminal moving from the initial viewing angle to the current viewing angle is opposite to the moving direction of the shooting device when the video is shot; searching a frame corresponding to the offset from the initial viewing frame in a direction in which the frame sequence number increases, in the case where the moving direction of the playback terminal moving from the initial viewing angle to the current viewing angle is the same as the moving direction of the shooting device when the video is shot; determining the frame corresponding to the offset as the frame corresponding to the current viewing angle.

In some embodiments, the device movement information comprises moving speed information; acquiring several frames in the video comprises: extracting moving speed information from the device movement information; determining a speed level, to which the moving speed information of each unit of time belongs; acquiring one or more frames from frames shot in each unit of time, wherein, a number of the frames is equal to a number corresponding to the speed level.

In some embodiments, the acquiring the initial viewing angle and the current viewing angle of the playback terminal comprises: during a playing process, acquiring angle information of the playback terminal in firstly playing a frame as an initial viewing angle; when a change degree of the angle information of the playback terminal is greater than a preset value, acquiring changed angle information as a current viewing angle.

In some embodiments, the non-transitory computer readable storage medium further stores program instructions which, when executed by the processor, cause the processor to: input two adjacent frames into a deep learning model to obtain image features of the two adjacent frames respectively; remove one of the two adjacent frames when a distance between the image features of the two adjacent frames is less than a preset value.

In some embodiments, the non-transitory computer readable storage medium further stores program instructions which, when executed by the processor, cause the processor to: compress several frames by adopting a Web picture compression algorithm based on predictive coding, wherein a compression quality is between 40 and 80.

Other features and advantages of the present disclosure will become clear through detailed descriptions of the illustrative embodiments of the present disclosure with reference to the following accompanying drawings.

BRIEF DESCRIPTION OF THE DRAWINGS

In order to more clearly illustrate the embodiments or technical solutions in existing technologies of the present disclosure, a brief introduction will be given below for the drawings required to be used in the description of the embodiments or technical solutions in existing technologies. It is obvious that, the drawings illustrated as follows are merely some of the embodiments of the present disclosure. For an ordinary skilled in the art, he or she may also acquire other drawings according to such drawings without paying inventive efforts.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure instead of all of them. The following descriptions on at least one illustrative embodiment are actually illustrative, but shall not set any limitation on the present disclosure and its application or utilization. All other embodiments that are obtainable to those skilled in the art based on the embodiments of the present disclosure without any creative effort are included in the protection scope of the present disclosure.

Unless otherwise illustrated, respective arrangements, mathematic expressions and values of the components and steps illustrated in these embodiments do not limit the scope of the present disclosure.

Meanwhile, it shall be understood that in order to facilitate description, the respective parts shown in the drawings are not drawn in sizes according to actual proportional relations.

Techniques, methods and devices that have already been known to ordinary technicians in the art may not be discussed here in detail, but under suitable circumstances, the techniques, methods and devices shall be deemed as parts of the granted description.

In the embodiments shown and discussed here, any specific value shall be interpreted as only illustrative, instead of limitative. Hence, other embodiments of the illustrative embodiments may have different values.

It shall be noted that similar marks and letters represent similar items in the following figures, so once a certain item is defined in one figure, no further discussion on it is required in the following figures.

One technical problem to be solved by the embodiments of the present disclosure is: how to improve the convenience of user operation when playing back images.

The inventor has found that there is a large difference between pictures taken at different angles for a subject, respectively, in the prior art. Besides the photos, a video could also be adopted as an image display mode. The video is characterized by a small difference between adjacent frames, and thus a smooth transition could be performed when the shooting angle changes. However, due to the ordering of frames in the video, the frames in the video are played in order, and the user has less freedom in viewing.

Therefore, frames in the video could be acquired, and according to the angle of the playback terminal during playing, corresponding frames are selected to be played. A playback method of some embodiments of the present disclosure is described below with reference to FIG. 1.

Figure 1:
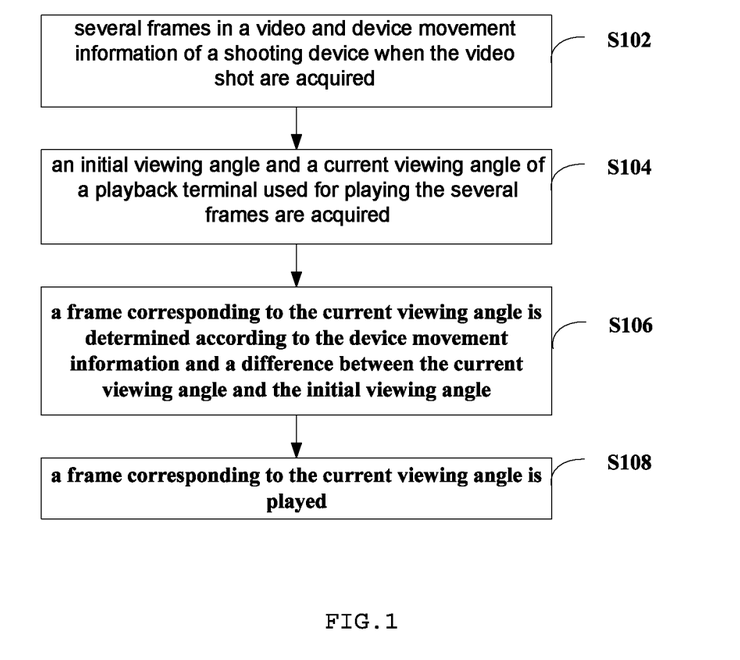
FIG. 1 is an exemplary flow diagram of a playback method according to some embodiments of the present disclosure.

FIG. 1 is an exemplary flow diagram of a playback method according to some embodiments of the present disclosure. As shown in FIG. 1, the playback method of this embodiment comprises steps S102 to S108.

In step S102, several frames in a video and device movement information of a shooting device when the video is shot are acquired.

The video in the embodiments of the present disclosure could be a movably shot video for people, objects and scenes. For example, the video may be a video of an object taken in a clockwise direction or a left-to-right direction, so the video may have image information of the object from a plurality of angles.

When shooting is performed, device movement information of the shooting device, such as a movement direction, a movement angle, a movement speed, and the like of the device, may be recorded, and the information may be collected by a sensor such as a gyroscope in the shooting device, for example; the device movement information and the video could then be stored in association so that the video and corresponding device movement information could be obtained when the video is played.

The acquired several frames in the video may be all the frames contained in the video, or may be part of the frames extracted from the video.

When the acquired frames are all the frames contained in the video, the switching between two adjacent frames in the playing process could be smoother; when the acquired several frames are part of the frames extracted from the video, the number of frames to be played could be reduced, thereby saving the storage space. Those skilled in the art could make selections as desired.

In step S104, an initial viewing angle and a current viewing angle of a playback terminal used for playing the several frames are acquired.

When the playback terminal is at the initial viewing angle, the playback terminal plays a preset initial viewing frame. The initial viewing frame may be, for example, a frame showing a front view of the subject, or may be, for example, a frame capable of representing a salient feature of the subject. Of course, those skilled in the art could set the initial viewing frame as needed, and the details are not described here.

In some embodiments, the initial viewing angle may be angle information of the playback terminal at first playing a frame during a playing process. For example, when the user first enters a play interface of an image of an object, the x axis in the coordinate system of the playback terminal faces due north, thus the due north or an angle of 0° with the due north is taken as an initial viewing angle, then an initial viewing frame is played for the user.

In addition, an angle between the preset axis of the playback terminal and a certain direction could be preset as the initial viewing angle. For example, if an included angle of 0° between the x axis in the coordinate system of the playback terminal and the due north is taken as the initial viewing angle, the playback terminal plays the initial viewing frame when the playback terminal is at the initial viewing angle.

The user could rotate or move the playback terminal in the viewing process, so that the angle of the playback terminal is changed, thereby switching the playing frame. In some embodiments, the playback terminal may monitor changes in the angle of the playback terminal, and when a change degree of the angle information of the playback terminal is greater than a preset value, the changed angle information is acquired as the current viewing angle.

In step S106, a frame corresponding to the current viewing angle is determined according to the device movement information and a difference between the current viewing angle and the initial viewing angle.

The difference between the current viewing angle and the initial viewing angle represents the movement direction and movement magnitude of the device during playback. When the movement amplitude is large, the difference between the currently played frame and the initially played frame should be large.

The device movement information affects the specific selection of the frame to be played. For example, if the shooting device moves from left to right during shooting, then a frame shot earlier than the currently played frame, that is, a frame recording the left image of the object, should be played for the user when the user moves the playback terminal to left during viewing; for another example, the shooting device is rotated clockwise during shooting, then a frame shot later than the currently played frame should be played for the user when the viewing user rotates the terminal clockwise. Some embodiments of the present disclosure provide a method of determining a frame to be played.

In some embodiments, the device movement information comprises a moving direction. A ratio of the difference between the current viewing angle and the initial viewing angle to a viewing range as an offset could be determined. If the current viewing angle is biased toward a starting direction when the video is shot relative to the initial viewing angle, i.e., the moving direction of the playback terminal moving from the initial viewing angle to the current viewing angle is opposite to the moving direction of the shooting device when the video is shot, then a frame corresponding to the offset is searched from the initial viewing frame in a direction in which the frame sequence number decreases; if the current viewing angle is biased toward an end direction when the video is shot relative to the initial viewing angle, i.e., the moving direction of the playback terminal moving from the initial viewing angle to the current viewing angle is the same as the moving direction of the shooting device when the video is shot, a frame corresponding to the offset is searched from the initial viewing frame in a direction in which the frame sequence number increases. Then, the frame corresponding to the offset could be determined as the frame corresponding to the current viewing angle.

In some embodiments, the viewing range refers to an angular range in which a user could trigger the image to change when viewing. For example, let the viewing range be 0° to 90°, and the initial viewing angle be 45°. When the current viewing angle of the playback terminal is 50°, the playback terminal still plays a frame corresponding to 45° for the user, that is, plays the first frame or the last frame of the acquired several frames. Therefore, a frame corresponding to the current viewing angle can be accurately searched so that the viewing angle is matched with an angle during shooting.

Of course, those skilled in the art could determine the frame corresponding to the current viewing angle in other ways. For example, the offset may be a ratio of a difference between the current viewing angle and a viewing angle corresponding to a frame played last time to the viewing range. If the current viewing angle is biased toward the starting direction when the video is shot relative to the viewing angle corresponding to the last played frame, i.e., a moving direction of the playback terminal moving from the initial viewing angle to the current viewing angle is opposite to the moving direction of the shooting device when the video is shot, then a frame corresponding to the offset is searched from the initial viewing frame in the direction in which the frame sequence number decreases; if the current viewing angle is biased toward the end direction when the video is shot relative to the viewing angle corresponding to the last played frame, i.e., the moving direction of the playback terminal moving from the initial viewing angle to the current viewing angle is the same as the moving direction of the shooting device when the video is shot, then a frame corresponding to the offset is searched from the initial viewing frame in the direction in which the frame sequence number increases. Other determination methods could be adopted by those skilled in the art as required, and are not described in detail herein.

In step S108, a frame corresponding to the current viewing angle is played.

By adopting the method of the above embodiment, several frames could be obtained from the video as frames to be played, and the frame corresponding to the current viewing angle is determined according to the device movement information and a difference between the current viewing angle and the initial viewing angle, so that the played content could be changed along with the change of the viewing angle of the playback terminal, and the convenience of user operation is improved.

In some application scenes, a person holds a shooting device manually to shoot, so that a situation that the moving speed of the shooting device is not uniform is likely to occur in the shooting process, so that more frames are shot at certain angles, and less frames are shot at other angles. Some embodiments of the present disclosure may address this problem.

Figure 2:
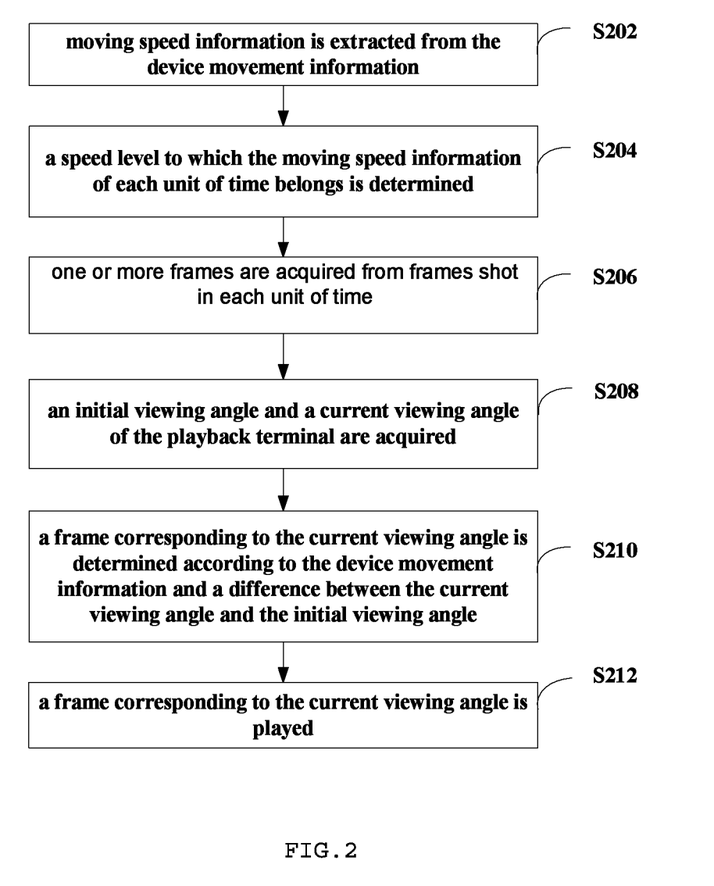
FIG. 2 is an exemplary flow diagram of a playback method according to some other embodiments of the present disclosure.

FIG. 2 is an exemplary flow diagram of a playback method according to some other embodiments of the present disclosure. As shown in FIG. 2, the playback method of this embodiment comprises steps S202 to S212.

In step S202, device movement information of a shooting device obtained at the time of shooting a video is acquired, and moving speed information is extracted from the device movement information.

In step S204, a speed level to which the moving speed information of each unit of time belongs is determined.

Several speed levels may be determined in advance. For example, level A is less than 0.03 $\pi$/ms, level B is between 0.03 and 0.08 $\pi$/ms, and level C is greater than 0.08 $\pi$/ms. The moving speed information may be measured by angular velocity, or may be measured by other velocity units such as linear velocity. A moving speed corresponding to the frame photographed in a unit of time may be determined by a moving amplitude in the unit of time.

In step S206, one or more frames are acquired from frames shot in each unit of time, wherein a number of the frames is equal to a number corresponding to the speed level.

The number of frames corresponding to each speed level may be set in advance. For example, if frames shot in a unit of time correspond to the speed level A, 10 frames are acquired from the frames in the unit of time for subsequent processing; if the frames shot in the unit of time correspond to the speed level B, 20 frames are acquired for subsequent processing. The number of frames acquired from the frames shot in the unit of time and the moving speed information corresponding to the unit of time are in a positive correlation relationship.

In step S208, an initial viewing angle and a current viewing angle of the playback terminal are acquired.

In step S210, a frame corresponding to the current viewing angle is determined according to the device movement information and a difference between the current viewing angle and the initial viewing angle.

In step S212, a frame corresponding to the current viewing angle is played.

For the specific implementation of steps S208 to S212, reference may be made to steps S104 to S108, which are not described herein.

By adopting the method of the above embodiment, images of the photographed subject at multiple angles could be uniformly acquired, so that when the user views the played images, the switching between frames at different viewing angles is smoother.

In addition, the frame to be played could be preprocessed before being played, so that the space and the bandwidth occupied by the frames to be played are further reduced. An embodiment of a playback method of the present disclosure is described below with reference to FIG. 3.

Figure 3:
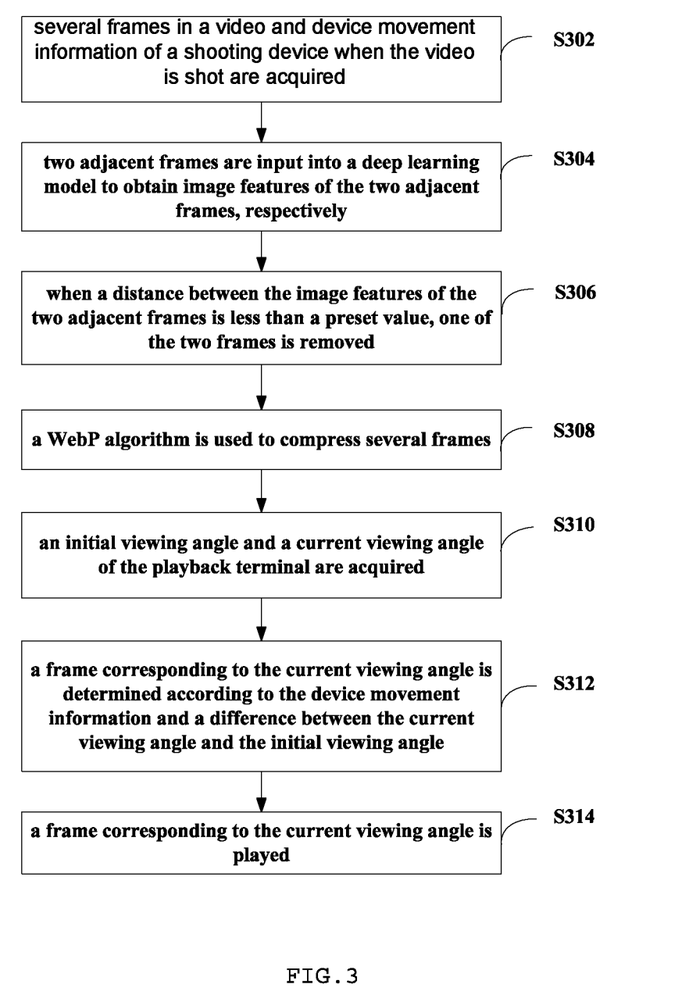
FIG. 3 is an exemplary flow diagram of a playback method according to still some other embodiments of the present disclosure.

FIG. 3 is an exemplary flow diagram of a playback method according to still some other embodiments of the present disclosure. As shown in FIG. 3, the playback method of this embodiment comprises steps S302 to S314.

In step S302, several frames in a video and device movement information of a shooting device when the video is shot are acquired.

In step S304, two adjacent frames are input into a deep learning model to obtain image features of the two adjacent frames, respectively.

The deep learning model is a classification model trained in advance, and may be, for example, GoogleNet (google deep convolutional neural network model). The embodiment of the present disclosure obtains an output result of the trained model at each node of the last layer, generating the image features of the input frame.

In step S306, when a distance between the image features of the two adjacent frames is less than a preset value, one of the two frames is removed. That is, when the similarity between two adjacent frames is large, only one of the frames is reserved to reduce repetition.

By adopting the method of steps S304-S306, the number of frames to be played could be reduced without influencing the viewing experience, thus saving the storage space and the transmission bandwidth.

In step S308, a WebP algorithm is used to compress several frames, wherein a compression quality is between 40 and 80.

WebP is a new picture encoding and decoding algorithm provided by google and open source contributors, and is a Web picture compression algorithm based on Predictive Coding. The compression degree of WebP is greater than that of JPEG (Joint Photographic Experts Group) under the condition that the quality of the compressed pictures are same.

Through tests, the inventor finds that when the compression quality is set between 40-80 under the condition that the efficiency and the quality are considered at the same time, the compression could be efficiently completed, and the picture occupies a smaller storage space on the premise of ensuring the quality. In some tests, better results are obtained when the compression quality is set to 60.

Therefore, the size of each frame could be reduced without influencing the viewing experience, saving the storage space and the transmission bandwidth.

In step S310, an initial viewing angle and a current viewing angle of the playback terminal are acquired.

In step S312, a frame corresponding to the current viewing angle is determined according to the device movement information and a difference between the current viewing angle and the initial viewing angle.

In step S314, a frame corresponding to the current viewing angle is played.

As required, one or two optimization methods in steps S304 to S306 and step S308 may be selected by those skilled in the art, and other optimization methods may also be adopted, which are not described herein.

An embodiment of a playback device of the present disclosure is described below with reference to FIG. 4.

Figure 4:
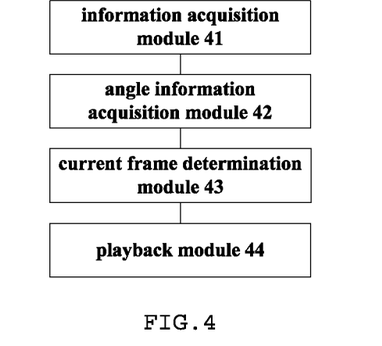
FIG. 4 is an exemplary block diagram of a playback device according to some embodiments of the present disclosure.

FIG. 4 is an exemplary block diagram of a playback device according to some embodiments of the present disclosure. As shown in FIG. 4, the playback device of this embodiment comprises: an information acquisition module 41 configured to acquire several frames in a video and device movement information of a shooting device when the video is shot; an angle information acquisition module 42 configured to acquire an initial viewing angle and a current viewing angle of a playback terminal used for playing the several frames; a current frame determination module 43 configured to determine a frame corresponding to the current viewing angle according to the device movement information and a difference between the current viewing angle and the initial viewing angle; and a playback module 44 configured to play the frame corresponding to the current viewing angle.

The playback device provided by the embodiment of the present disclosure could be the same device or apparatus as the shooting device, and could also be a different device or apparatus.

In some embodiments, the device movement information may comprise direction information, such as a moving direction. The current frame determination module 43 could be further configured to: determine a ratio of the difference between the current viewing angle and the initial viewing angle to a viewing range as an offset; search a frame corresponding to the offset from the initial viewing frame in a direction in which a frame sequence number decreases, in the case where a moving direction of the playback terminal moving from the initial viewing angle to the current viewing angle is opposite to the moving direction when the video is shot; search a frame corresponding to the offset from the initial viewing frame in a direction in which the frame sequence number increases, in the case where the moving direction of the playback terminal moving from the initial viewing angle to the current viewing angle is the same as the moving direction of the shooting device when the video is shot; determining the frame corresponding to the offset as the frame corresponding to the current viewing angle.

In some embodiments, the device movement information comprises moving speed information; the information acquisition module 41 could be further configured to: extract moving speed information from the device movement information; determine a speed level, to which the moving speed information of each unit of time belongs; acquire one or more frames from frames shot in each unit of time, wherein, a number of the frames is equal to a number corresponding to the speed level.

In some embodiments, the angle information acquisition module 42 could be further configured to: during a playing process, acquire angle information of the playback terminal in firstly playing a frame as an initial viewing angle; when a change degree of the angle information of the playback terminal is greater than a preset value, acquire changed angle information as a current viewing angle.

Figure 5:
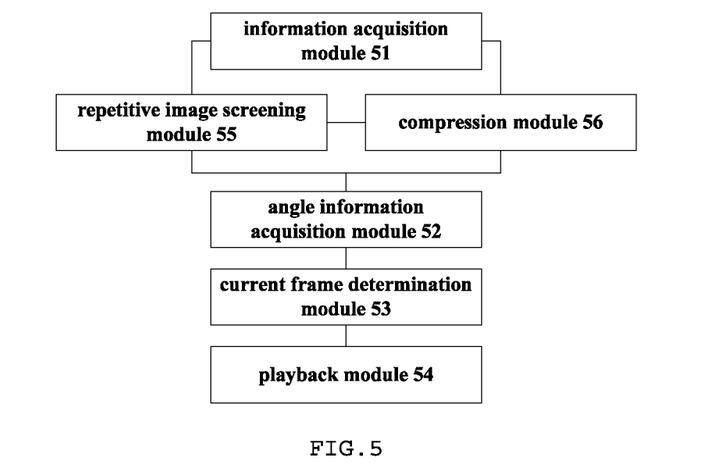
FIG. 5 is an exemplary block diagram of a playback device according to some other embodiments of the present disclosure.

FIG. 5 is an exemplary block diagram of a playback device according to some other embodiments of the present disclosure. As shown in FIG. 5, the playback device of this embodiment comprises an information acquisition module 51, an angle information acquisition module 52, a current frame determination module 53, and a playback module 54. Specific implementation of these modules may refer to corresponding modules in the embodiment of FIG. 4, and are not described in detail herein.

In addition, the playback device of this embodiment may further comprise: a repetitive image screening module 55 configured to input two adjacent frames into a deep learning model to obtain image features of the two adjacent frames respectively; remove one of the two adjacent frames when a distance between the image features of the two adjacent frames is less than a preset value.

Furthermore, the playback device of this embodiment may further comprise a compression module 56 configured to compress several frames by adopting a Web picture compression algorithm based on predictive coding, wherein a compression quality is between 40 and 80.

Figure 6:
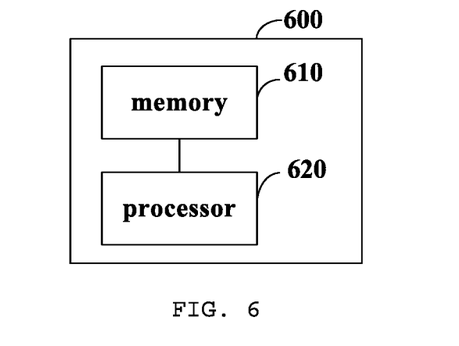
FIG. 6 is an exemplary block diagram of a playback device according to still some other embodiments of the present disclosure.

FIG. 6 is an exemplary block diagram of a playback device according to still some other embodiments of the present disclosure. As shown in FIG. 6, device 600 of this embodiment comprises: a memory 610 and a processor 620 coupled to the memory 610, the processor 620 being configured to perform the playback method of any of the embodiments described above based on instructions stored in the memory 610.

In some embodiments, memory 610 may comprise, for example, a system memory, fixed non-volatile storage media, and the like. The system memory stores, for example, an operating system, an application program, a Boot Loader, and other programs.

Figure 7:
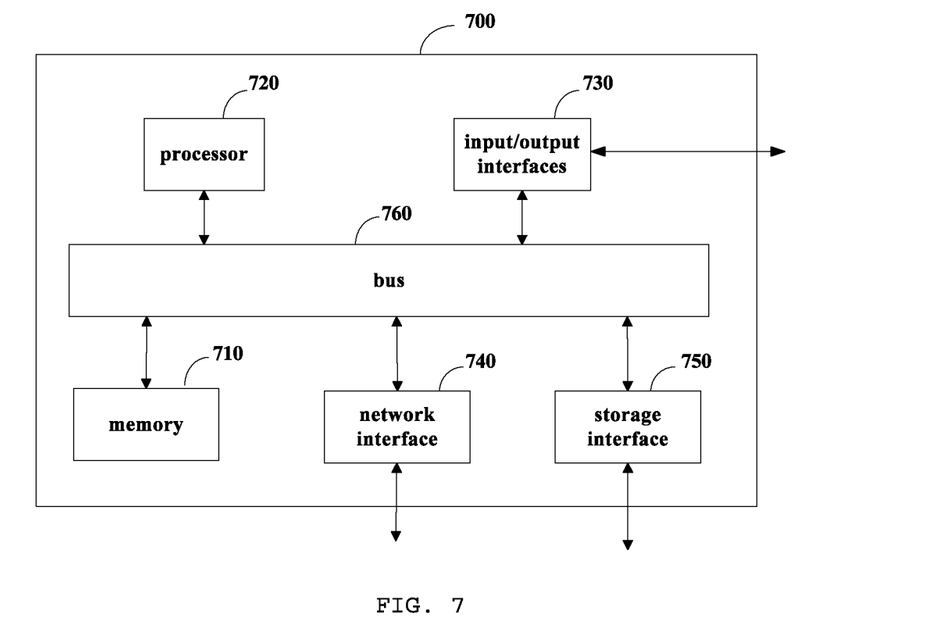
FIG. 7 is an exemplary block diagram of a playback device according to still some other embodiments of the present disclosure.

FIG. 7 is an exemplary block diagram of a playback device according to still some other embodiments of the present disclosure. As shown in FIG. 7, device 700 of this embodiment comprises memory 710 and processor 720, and may also comprise input/output interface 730, network interface 740, storage interface 750, and so forth. These interfaces 730, 740, 750 and the memory 710 and the processor 720 may be connected by a bus 760, for example. In some embodiments, the input/output interface 730 provides a connection interface for input/output devices such as a display, a mouse, a keyboard, and a touch screen. The network interface 740 provides a connection interface for various networking devices. The storage interface 750 provides a connection interface for an external storage device such as an SD card and a U disk.

The embodiments of the present disclosure also provide a computer-readable storage medium having stored thereon a computer program, characterized in that the program, when executed by a processor, implements any one of the foregoing playback methods.

It shall be understood by those skilled in the art that the embodiments of the present disclosure may be provided as a method, a system, or a computer program product. Therefore, examples of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (including but not limited to disks, CD-ROM, optical storage, etc.) having computer-usable program code embodied in the medium.

The present disclosure is described with reference to the flow diagrams and/or block diagrams of the method, device (system) and computer program product according to the embodiments of the present disclosure. It shall be understood that each flow and/or block in the flow diagrams and/or block diagrams and a combination thereof may be implemented by computer program instructions. These computer program instructions may be provided to the processor of a general purpose computer, a dedicated computer, an embedded processing device or any other programmable data processing device to produce a machine causing the instructions executed by the processor of the computer or the other programmable data processing device to produce means for implementing the functions designated in the one or more flows in the flow charts and/or one or more blocks in the block diagrams.

These computer program instructions may be stored in a computer readable memory that can direct a computer or any other programmable data processing device to operate in a specific manner, such that the instructions stored in the computer readable memory produce a manufactured article including instruction means that implements the functions designated in one or more flows in the flow charts and/or one or more blocks in the block diagrams.

These computer program instructions may also be loaded on a computer or any other programmable data processing device causing the computer or the other programmable data processing device to perform a series of operation steps to produce a computer-implemented process, such that the instructions executed on the computer or the other programmable device provide steps for implementing the functions designated in the one or more flows in the flow charts and/or one or more blocks in the block diagrams.

The above contents are only preferred embodiments of the present disclosure, but are not used to limit the present disclosure. Any modification, equivalent replacement, improvement and etc. within spirit and principles of the present disclosure shall be contained in the protection scope of the present disclosure.

What is claimed is:

1. A playback method comprising:
acquiring several frames in a video and device movement information of a shooting device when the video is shot, wherein the device movement information comprises a moving direction;
acquiring an initial viewing angle and a current viewing angle of a playback terminal used for playing the several frames;
determining a frame corresponding to the current viewing angle according to the device movement information and a difference between the current viewing angle and the initial viewing angle, comprising:
determining a ratio of the difference between the current viewing angle and the initial viewing angle to a viewing range as an offset;
searching a frame corresponding to the offset from the initial viewing frame in a direction in which a frame sequence number decreases, in the case where a moving direction of the playback terminal moving from the initial viewing angle to the current viewing angle is opposite to the moving direction of the shooting device when the video is shot;
searching a frame corresponding to the offset from the initial viewing frame in a direction in which the frame sequence number increases, in the case where the moving direction of the playback terminal moving from the initial viewing angle to the current viewing angle is the same as the moving direction of the shooting device when the video is shot; and
determining the frame corresponding to the offset as the frame corresponding to the current viewing angle; and
playing the frame corresponding to the current viewing angle.

2. The playback method of claim 1, wherein the device movement information further comprises moving speed information;

acquiring several frames in the video comprises:
    extracting moving speed information from the device movement information;
    determining a speed level, to which the moving speed information of each unit of time belongs;
    acquiring one or more frames from frames shot in each unit of time, wherein, a number of the frames is equal to a number corresponding to the speed level.

3. The playback method of claim 1, wherein the acquiring the initial viewing angle and the current viewing angle of the playback terminal comprises:
    during a playing process, acquiring angle information of the playback terminal in firstly playing a frame as an initial viewing angle;
    when a change degree of the angle information of the playback terminal is greater than a preset value, acquiring changed angle information as a current viewing angle.

4. The playback method of claim 1, further comprising:
    inputting two adjacent frames into a deep teaming model to obtain image features of the two adjacent frames respectively;
    removing one of the two adjacent frames when a distance between the image features of the two adjacent frames is less than a preset value.

5. The playback method of claim 1, further comprising:
    compressing several frames by adopting a Web picture compression algorithm based on predictive coding, wherein a compression quality is between 40 and 80.

6. A playback device, comprising:
    a processor; and
    a memory coupled to the processor, storing program instructions which, when executed by the processor, cause the processor to:
    acquire several frames in a video and device movement information of a shooting device when the video is shot, wherein the device movement information comprises a moving direction;
    acquire an initial viewing angle and a current viewing angle of a playback terminal used for playing the several frames;
    determine a frame corresponding to the current viewing angle according to the device movement information and a difference between the current viewing angle and the initial viewing angle, comprising:
    determining a ratio of the difference between the current viewing angle and the initial viewing angle to a viewing range as an offset;
    searching a frame corresponding to the offset from the initial viewing frame in a direction in which a frame sequence number decreases, in the case where a moving direction of the playback terminal moving from the initial viewing angle to the current viewing angle is opposite to the moving direction of the shooting device when the video is shot;
    searching a frame corresponding to the offset from the initial viewing frame in a direction in which the frame sequence number increases, in the case where the moving direction of the playback terminal moving from the initial viewing angle to the current viewing angle is the same as the moving direction of the shooting device when the video is shot; and
    determining the frame corresponding to the offset as the frame corresponding to the current viewing angle; and
    play the frame corresponding to the current viewing angle.

7. A non-transitory computer readable storage medium having stored thereon a computer instructions which, when executed by a processor, cause the processor to:
    acquire several frames in a video and device movement information of a shooting device when the video is shot, wherein the device movement information comprises a moving direction;
    acquire an initial viewing angle and a current viewing angle of a playback terminal used for playing the several frames;
    determine a frame corresponding to the current viewing angle according to the device movement information and a difference between the current viewing angle and the initial viewing angle, comprising:
    determining a ratio of the difference between the current viewing angle and the initial viewing angle to a viewing range as an offset;
    searching a frame corresponding to the offset from the initial viewing frame in a direction in which a frame sequence number decreases, in the case where a moving direction of the playback terminal moving from the initial viewing angle to the current viewing angle is opposite to the moving direction of the shooting device when the video is shot;
    searching a frame corresponding to the offset from the initial viewing frame in a direction in which the frame sequence number increases, in the case where the moving direction of the playback terminal moving from the initial viewing angle to the current viewing angle is the same as the moving direction of the shooting device when the video is shot; and
    determining the frame corresponding to the offset as the frame corresponding to the current viewing angle; and
    play the frame corresponding to the current viewing angle.

8. The playback device of claim 6, wherein the device movement information comprises moving speed information;
    acquiring several frames in the video comprises:
    extracting moving speed information from the device movement information;
    determining a speed level, to which the moving speed information of each unit of time belongs;
    acquiring one or more frames from frames shot in each unit of time, wherein, a number of the frames is equal to a number corresponding to the speed level.

9. The playback device of claim 6, wherein the acquiring the initial viewing angle and the current viewing angle of the playback terminal comprises:
    during a playing process, acquiring angle information of the playback terminal in firstly playing a frame as an initial viewing angle;
    when a change degree of the angle information of the playback terminal is greater than a preset value, acquiring changed angle information as a current viewing angle.

10. The playback device of claim 6, wherein the memory further stores program instructions which, when executed by the processor, cause the processor to:
    input two adjacent frames into a deep learning model to obtain image features of the two adjacent frames respectively;
    remove one of the two adjacent frames when a distance between the image features of the two adjacent frames is less than a preset value.

11. The playback device of claim 6, wherein the memory further stores program instructions which, when executed by the processor, cause the processor to:

compress several frames by adopting a Web picture compression algorithm based on predictive coding, wherein a compression quality is between 40 and 80.

12. The non-transitory computer readable storage medium of claim 7, wherein the device movement information comprises moving speed information;

acquiring several frames in the video comprises:

extracting moving speed information from the device movement information;

determining a speed level, to which the moving speed information of each unit of time belongs;

acquiring one or more frames from frames shot in each unit of time, wherein, a number of the frames is equal to a number corresponding to the speed level.

13. The non-transitory computer readable storage medium of claim 7, wherein the acquiring the initial viewing angle and the current viewing angle of the playback terminal comprises:

during a playing process, acquiring angle information of the playback terminal in firstly playing a frame as an initial viewing angle;

when a change degree of the angle information of the playback terminal is greater than a preset value, acquiring changed angle information as a current viewing angle.

14. The non-transitory computer readable storage medium of claim 7, further storing program instructions which, when executed by the processor, cause the processor to:

input two adjacent frames into a deep learning model to obtain image features of the two adjacent frames respectively;

remove one of the two adjacent frames when a distance between the image features of the two adjacent frames is less than a preset value.

15. The non-transitory computer readable storage medium of claim 7, further storing program instructions which, when executed by the processor, cause the processor to:

compress several frames by adopting a Web picture compression algorithm based on predictive coding, wherein a compression quality is between 40 and 80.

* * * * *